(12) United States Patent
Oono

(10) Patent No.: US 10,670,925 B2
(45) Date of Patent: *Jun. 2, 2020

(54) DISPLAY DEVICE COMPRISING A FIRST INSULATING LAYER HAVING A FIRST CONCAVE PORTION FORMED BETWEEN A RESIN LAYER AND A PILLAR-SHAPED SPACER

(71) Applicant: Japan Display Inc., Minato-ku (JP)

(72) Inventor: Atsuko Oono, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,774

(22) Filed: Jun. 11, 2019

(65) Prior Publication Data

US 2019/0293985 A1 Sep. 26, 2019

Related U.S. Application Data

(60) Continuation of application No. 15/782,350, filed on Oct. 12, 2017, now Pat. No. 10,359,670, which is a
(Continued)

(30) Foreign Application Priority Data

Jun. 6, 2013 (JP) .................................. 2013-119733

(51) Int. Cl.
  *G02F 1/1339* (2006.01)
  *G02F 1/1333* (2006.01)
  *G02F 1/1341* (2006.01)

(52) U.S. Cl.
  CPC ........ *G02F 1/1339* (2013.01); *G02F 1/13394* (2013.01); *G02F 1/133345* (2013.01);
(Continued)

(58) Field of Classification Search
  CPC ........... G02F 2202/02; G02F 1/133345; G02F 1/13394
  See application file for complete search history.

(56) References Cited

U.S. PATENT DOCUMENTS 9,274,380 B2  3/2016  Oono
9,405,155 B2  8/2016  Oono
(Continued)

FOREIGN PATENT DOCUMENTS

JP    4-220622 A    8/1992
JP  2002-174818 A   6/2002
(Continued)

OTHER PUBLICATIONS

Office Action dated Apr. 5, 2016 in Japanese Patent Application No. 2013-119733 (with English translation).

*Primary Examiner* — Paul C Lee
(74) *Attorney, Agent, or Firm* — Oblon, McClelland, Maier & Neustadt, L.L.P.

(57) ABSTRACT

A first organic insulating film is arranged on a first substrate in a circumference area outside an active area. A mounting portion is located in the circumference area for mounting a signal source. A second organic insulating film is formed on a second substrate in the circumference area so as to face the first substrate. The second substrate exposes the mounting portion. A seal material is arranged between the first organic insulating film and the second organic insulating film to attach the first substrate and the second substrate. A resin layer is arranged between the first organic insulating film and the second organic insulating film in the circumference area, and formed in a rectangular frame shape including four linear ends. An end along the mounting portion is formed broadly than other ends.

13 Claims, 5 Drawing Sheets

Related U.S. Application Data continuation of application No. 15/176,991, filed on Jun. 8, 2016, now Pat. No. 9,823,523, which is a continuation of application No. 14/987,363, filed on Jan. 4, 2016, now Pat. No. 9,405,155, which is a division of application No. 14/297,915, filed on Jun. 6, 2014, now Pat. No. 9,274,380.

(52) U.S. Cl.
CPC ............... *G02F 1/1341* (2013.01); *G02F 2001/133388* (2013.01); *G02F 2202/02* (2013.01)

(56) References Cited

U.S. PATENT DOCUMENTS

| | | | |
|---|---|---|---|
| 10,359,670 B2* | 7/2019 | Oono | G02F 1/13394 |
| 2008/0062360 A1 | 3/2008 | Kobayashi | |
| 2008/0129946 A1* | 6/2008 | Chan | G02F 1/1339 349/153 |
| 2009/0066903 A1* | 3/2009 | Yoshida | G02F 1/1339 349/153 |
| 2010/0060842 A1* | 3/2010 | Igeta | G02F 1/1339 349/153 |
| 2010/0149463 A1* | 6/2010 | Shimizu | G02F 1/13394 349/106 |
| 2011/0310336 A1* | 12/2011 | Kobayashi | G02F 1/133514 349/106 |
| 2012/0033162 A1* | 2/2012 | Ahn | G02F 1/1339 349/106 |
| 2014/0055735 A1 | 2/2014 | Oono et al. | |

FOREIGN PATENT DOCUMENTS

| | | |
|---|---|---|
| JP | 2005-078003 A | 3/2005 |
| JP | 2006-030439 A | 2/2006 |
| JP | 2006-084881 A | 3/2006 |
| JP | 2007-171363 A | 7/2007 |
| JP | 2007-248832 A | 9/2007 |
| JP | 2008-151969 A | 7/2008 |
| JP | 2009/040967 A1 | 4/2009 |
| JP | 2010-224491 A | 10/2010 |
| JP | 2014-041282 | 3/2014 |

* cited by examiner

DISPLAY DEVICE COMPRISING A FIRST INSULATING LAYER HAVING A FIRST CONCAVE PORTION FORMED BETWEEN A RESIN LAYER AND A PILLAR-SHAPED SPACER

CROSS-REFERENCE TO RELATED APPLICATION

This application is a continuation of and claims the benefit of priority under 35 U.S.C. § 120 from U.S. Ser. No. 15/782,350, filed Oct. 12, 2017, which is a continuation of and claims the benefit of priority under 35 U.S.C. § 120 from U.S. Ser. No. 15/176,991, filed Jun. 8, 2016, which is a continuation of U.S. Ser. No. 14/987,363, filed Jan. 4, 2016 (now U.S. Pat. No. 9,405,155), which is a divisional of U.S. Ser. No. 14/297,915, now U.S. Pat. No. 9,274,380, filed Jun. 6, 2014, and which claims the benefit of priority under 35 U.S.C. § 119 from prior Japanese Patent Application No. 2013-119733, filed Jun. 6, 2013; the entire contents of each of which is incorporated herein by reference.

FIELD

Embodiments described herein relate generally to a liquid crystal display device and a method of manufacturing the same.

BACKGROUND

A liquid crystal display device is used in various fields as a display device. In such a liquid crystal display device, it is important to form a uniform cell gap (thickness of a liquid crystal layer held between a pair of substrates) of an active area which displays images. In recent years, while arranging a pillar-shaped spacer on one substrate as for forming the cell gap, a technology to form the spacer with sufficient accuracy in the height is established as requested. Thereby, the uniformity of the cell gap is attained.

There is a dropping injection method as one of the technology which manufactures the liquid crystal display device. In the dropping injection method, after liquid crystal material is dropped in a region surrounded by seal material on an array substrate or a counter substrate, the array substrate and the counter substrate are attached together in a state of vacuum, and returning to an atmospheric pressure state from the vacuum state. Thereby the pair of substrates is pressurized by pressure difference between the inside of the region surrounded by the seal material and open air pressure, and the seal material is crushed. Consequently, a predetermined cell gap is formed. The dropping injection method has advantages, such as shortening of tact time, improvement in efficiency of utilization of material, and improvement in accuracy of the cell gap.

As the seal material applied to the dropping injection method, ultraviolet curing type adhesives have been used widely. Since viscosity of the ultraviolet curing type adhesives is high, a drawing method using a dispenser, not a printing method is adopted.

In recent years, the cell gap tends to be made narrow to improve response characteristic, alignment characteristic, viewing angle characteristic, etc., of the liquid crystal display device. Moreover, the request for reducing the external configuration size of the liquid crystal display device is increasing, and the width of seal material tends to become narrow corresponding to the narrow frame.

On the other hand, in a neighborhood along a mounting portion for mounting signal sources such as a driving IC chip, since the seal material is crushed easily, and it is hard to form a desired cell gap compared with other neighborhoods, there is a possibility that the crushed area may be sighted as display unevenness. To such a subject, the technology of securing the uniformity of the cell gap and preventing display unevenness is proposed by arranging the spacer in the mounting portion as well as the display area.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
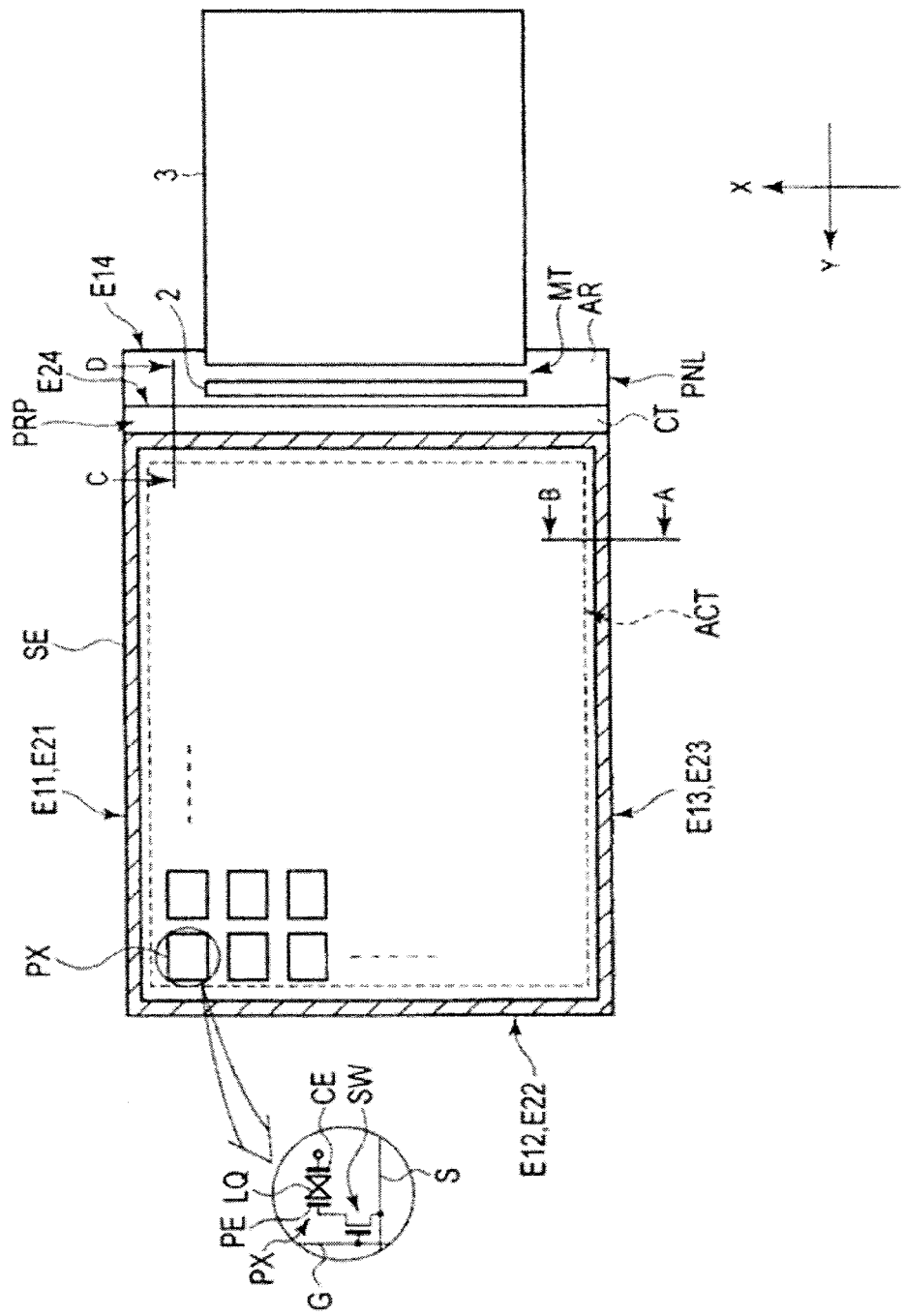
FIG. 1 is a plan view schematically showing a display panel PNL applicable to a liquid crystal display device according to an embodiment.

A liquid crystal display device and a method of manufacturing the same according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first insulating substrate, a first organic insulating film arranged on the first insulating substrate in a circumference area outside an active area for displaying images, an a mounting portion located in the circumference area for mounting a signal source, a second substrate including; a second insulating substrate, and a second organic insulating film formed on the second insulating substrate in the circumference area so as to face the first substrate, the second substrate exposing the mounting portion, a seal material arranged between the first organic insulating film and the second organic insulating film to attach the first substrate and the second substrate; a resin layer arranged between the first organic insulating film and the second organic insulating film in the circumference area, and formed in a rectangular frame shape including four linear ends, wherein an end along the mounting portion is formed broadly than other ends; and a liquid crystal layer held in a gap surrounded with the seal material between the first substrate and the second substrate.

According to other embodiment, a liquid crystal display device includes: a first substrate including; a first insulating substrate, a first organic insulating film arranged on the first insulating substrate in a circumference area outside an active area for displaying images, and a mounting portion located in the circumference area for mounting a signal source, a second substrate including; a second insulating substrate, and a second organic insulating film formed on the second insulating substrate in the circumference area so as to face the first substrate, the second substrate exposing the mounting portion, a resin layer arranged between the first organic insulating film and the second organic insulating film adjacent to a substrate end of the second substrate, and formed in a rectangular frame shape, a seal material arranged between the first organic insulating film and the second organic insulating film to attach the first substrate and the second substrate; and a liquid crystal layer held in a gap surrounded with the seal material between the first substrate and the second substrate, wherein a space in which the seal material does not intervene is formed along the mounting portion between the first organic insulating film and the resin layer or between the second organic insulating film and the resin layer in a position where the first substrate faces the second substrate.

According to other embodiment, a method of manufacturing a liquid crystal display device, comprising the steps: preparing a first mother substrate configured by a plurality of array substrates, each array substrate including a first organic insulating film arranged in a circumference area outside an active area for displaying images, and a mounting portion located in the circumference area for mounting a signal source; preparing a second mother substrate configured by a plurality of counter substrates, each counter substrate including a second organic insulating film in the circumference area; arranging a seal material between the first organic insulating film and the second organic insulating film to attach the first mother substrate and the second mother substrate; forming a resin layer on the array substrate or the counter substrate in a rectangular frame shape including four linear ends in the circumference area, wherein an end along the mounting portion for mounting a signal source is formed broadly than other ends; attaching the first mother substrate and the second mother substrate; forming a liquid crystal layer held in a gap surrounded with the seal material between the array substrate and the counter substrate, and cutting down the first and second mother substrates along cutting lines to separate the respective array substrates and the counter substrates, wherein a space in which the seal material does not intervene is formed along the mounting portion between the first organic insulating film and the resin layer or between the second organic insulating film and the resin layer in a position where the first substrate faces the second substrate.

FIG. 1 is a plan view schematically showing a display panel PNL applicable to the liquid crystal display device according to an embodiment.

The display panel PNL is formed of an active-matrix type liquid crystal display panel, and equipped with a liquid crystal layer LQ held between an array substrate AR and a counter substrate CT facing the array substrate AR. The array substrate AR and the counter substrate CT are pasted together by a seal material SE while a predetermined cell gap is formed between the substrates. In the illustrated example, the seal material SE is formed in a closed-shape of rectangular frame. The cell gap is formed of pillar-shaped spacers arranged in the array substrate AR or the counter substrate CT. The liquid crystal layer LQ is held in the cell gap formed between the array substrate AR and the counter substrate CT, and surrounded with the seal material SE. The display panel PNL is equipped with an active area ACT which displays a picture on the inner side surrounded by the seal material SE. The active area ACT is formed of an approximately rectangular shape, and formed of a plurality of pixels PX arranged in the shape of a matrix, for example.

The array substrate AR is equipped with a gate line G extending in a first direction X, a source line S extending in a second direction Y orthogonally crossing the X direction so as to cross the gate line G, a switching element SW connected with the gate line G and the source line S, a pixel electrode PE connected with the switching element SW, etc. Although the counter substrate CT is equipped with a counter electrode CE facing each of the pixel electrodes PE through the liquid crystal layer LQ, for example, the array substrate AR may be equipped with the counter electrode CE.

In addition, explanation is omitted about the detailed structure of the display panel PNL. In the modes such as TN (Twisted Nematic) mode, OCB (Optically Compensated Bend) mode, and VA (Vertical Aligned) mode which mainly use vertical electric field, while the array substrate AR is equipped with the pixel electrode PE, the counter substrate CT is equipped with the counter electrode CE. Moreover, the array substrate AR is equipped with the both of the pixel electrode PE and the counter electrode CE in the modes which mainly use lateral electric field, such as IPS (In-Plane Switching) mode and FFS (Fringe Field Switching) mode.

In this embodiment, the display panel PNL is formed in a square shape, and the array substrate AR and the counter substrate CT are also formed in the square shape. The array substrate AR has substrate ends E11 to E14, and the counter substrate CT has substrate ends E21 to E24. The substrate end E11 overlaps with the substrate end E21, the substrate end E12 overlaps with the substrate end E22, the substrate end E13 overlaps with the substrate end E23, and the substrate end E14 is located outside of the substrate end E24. That is, the array substrate AR extends to outside the substrate end E24 of the counter substrate CT, and has a mounting portion MT between the substrate end E14 and the substrate end E24. The counter substrate CT exposes the mounting portion MT.

The signal source required for driving the display panel PNL, such as a driving IC chip 2 and a flexible printed circuit (FPC) substrate 3, is located in the circumference area PRP outside the active area. ACT. In this embodiment, the driving IC chip 2 and the FPC substrate 3 are mounted in the mounting portion MT. The circumference area PRP is an area surrounding the active area ACT, and is formed in the shape of a rectangular frame including the area where the seal material SE is arranged.

In addition, in the illustrated display panel PNL, the seal material SE extends up to three sides except the mounting portion MT, i.e., the position in which the substrate end E11 and the substrate end E21 overlap, the position in which the substrate end E12 and the substrate end E22 overlap, and the position in which the substrate end E13 and the substrate end E23 overlap, respectively. Moreover, in the position where the array substrate AR and the counter substrate CT counter along with the mounting portion MT, the seal material SE stopped on the active area side rather than the substrate end E24, and does not extend to the substrate end E24.

Figure 2:
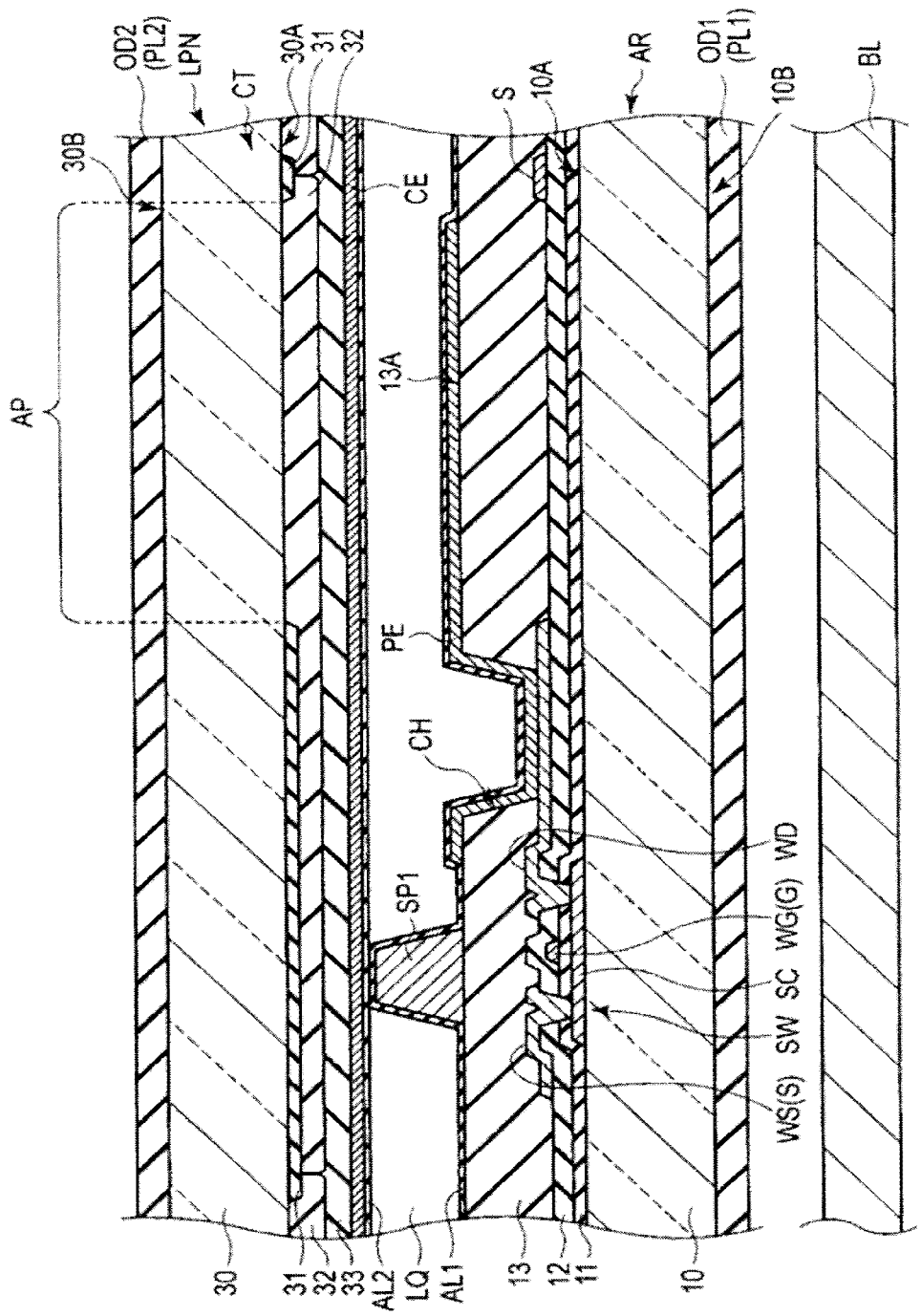
FIG. 2 is a cross-sectional view schematically showing a structure of one pixel including a switching element SW of the display panel PNL shown in FIG. 1.

FIG. 2 is a cross-sectional view schematically showing a structure of one pixel including a switching element SW of the display panel PNL shown in FIG. 1. Herein, a cross-cross-sectional structure of the display panel PNL in which the vertical electric field mode is applied is explained as one example.

The array substrate AR is formed using a transparent first insulating substrates 10, such as a glass substrate and a resin substrate. The array substrate AR includes a switching element SW, a pixel electrode PE, a first insulating film 11, a second insulating film 12, a third insulating film 13, a pixel electrode, a first alignment film AL1, a pillar-shaped spacer SP1, etc., facing the counter substrate CT of the first insulating substrate 10.

The switching element SW shown here is a thin film transistor (TFT), for example. Although the switching elements SW may be any of a top gated type and a bottom gated type, the top gated type is used in this embodiment. The switching element SW is equipped with a semiconductor layer SC arranged on the first insulating substrate 10. Although the semiconductor layer SC may be formed with poly-silicon, amorphous silicon, oxide semiconductor, etc., the poly-silicon is used in this embodiment. In addition, an under coat layer which is an insulating film may be arranged between the first insulating substrate 10 and the semiconductor layer SC. The semiconductor layer SC is covered with the first insulating film 11. Moreover, the first insulating film 11 is arranged also on the first insulating substrate 10.

A gate electrode WG of the switching element SW is formed on the first insulating film 11, and located right above the semiconductor layer SC. The gate electrode WG is electrically connected with the gate line G, or formed in one with the gate line G. The gate line G containing the gate electrode WG is covered with the second insulating film 12. Moreover, the second insulating film 12 is arranged also on the first insulating film 11. The first insulating films 11 and the second insulating Mm 12 are formed of transparent inorganic system materials, such as silicon oxide (SiOx), for example.

A source electrode WS and a drain electrode WD of the switching element SW are formed on the second insulating film 12. The source electrode WS is electrically connected with the source line S, or formed in one with the source line S. The drain electrode WD is apart from the source line S. The source electrode WS and the drain electrode WD are in contact with the semiconductor layer SC through a contact hole which penetrates the first insulating film 11 and the second insulating film 12, respectively. The source line S containing the source electrode WS and the drain electrode WD are covered with a third insulating film 13. The third insulating film 13 is arranged also on the second insulating film 12. A contact hole CH which penetrates to the drain electrode WD is formed in the third insulating film 13. The third insulating film 13 is formed, for example, of a transparent resin material, and equivalents to a first organic insulating film.

The pixel electrode PE is formed on the third insulating film 13. The pixel electrode PE is in contact with the drain electrode WD through the contact hole CH. The pixel electrode PE is formed of transparent electric conductive materials, such as Indium Tin Oxide (ITO) and Indium Zinc Oxide (IZO), for example. The pixel electrode PE is covered with the first alignment film AL1.

The pillar-shaped spacer SP1 is formed on the third insulating film 13. The pillar-shaped spacer SP1 is formed, for example, of resin material so as to contact the counter substrate CT.

On the other hand, the counter substrate CT is formed using the transparent second insulating substrates 30, such as a glass substrate and a resin substrate. The counter substrate CT is equipped with a shield layer (black matrix) 31, a color filter 32 (a red color filter layer, a green color filter layer, and a blue color filter layer are included), an overcoat film 33, a common electrode CE, and a second alignment film AL2, etc., on the second insulating substrate 30 facing the array substrate AR.

The shield layer 31 is formed on the second insulating substrate 30 facing the array substrate AR, and defines each pixel PX forming an aperture AP in the active area ACT. The shield layer 31 counters line portions arranged in the array substrate AR, such as the gate line G, the source line S, and the switching element SW.

The color filter 32 is formed in the aperture AP, and also extends on the shield layer 31. The color filter 32 is formed of the resin material colored in several mutually different colors, for example, three primary colors of red, blue and green. The boundary of the different color filters overlaps with the shield layer 31.

The overcoat film 33 covers the color filter 32. The overcoat film 33 makes flat the surface unevenness of the shield layer 31 and the color filter 32. The overcoat film 33 is formed of transparent resin material.

The common electrode CE is formed on the overcoat film 33 facing the array substrate AR. The common electrode CE is formed of transparent electric conductive materials, such as ITO and IZO. The common electrode CE is covered with the second alignment film AL2.

The array substrate AR and the counter substrate CT as mentioned above are arranged so that the first alignment film AL1 and the second alignment film AL2 face each other. In this case, the pillar-shaped spacer SP1 is arranged between the array substrate AR and the counter substrate CT, and a predetermined cell gap is formed therebetween. In this embodiment shown in FIG. 2, the pillar-shaped spacer SP1 is formed on the array substrate AR, and supports the counter substrate CT. In addition, the pillar-shaped spacer SP1 may be formed on the counter substrate CT so as to support the array substrate AR. The array substrate AR and the counter substrate CT are pasted together by the seal material so as to form the cell gap therebetween. The liquid crystal layer LQ is constituted by liquid crystal composite containing liquid crystal molecules enclosed in the cell gap formed between the first alignment film AL1 and the second alignment film AL2.

A first optical element OD1 equipped with a first polarizing plate PL1 is arranged in the external surface of the array substrate AR, i.e., the external surface 10B of the first insulating substrate 10. Moreover, a second optical element OD2 equipped with the second polarizing plate PL2 is arranged in the external surface of the counter substrate CT, i.e., the external surface 30B of the second insulating substrate 30.

The back light BL is arranged on the back side of the display panel PNL. As the back light BL, although various forms are applicable, the explanation about a detailed structure is omitted.

Figure 3:
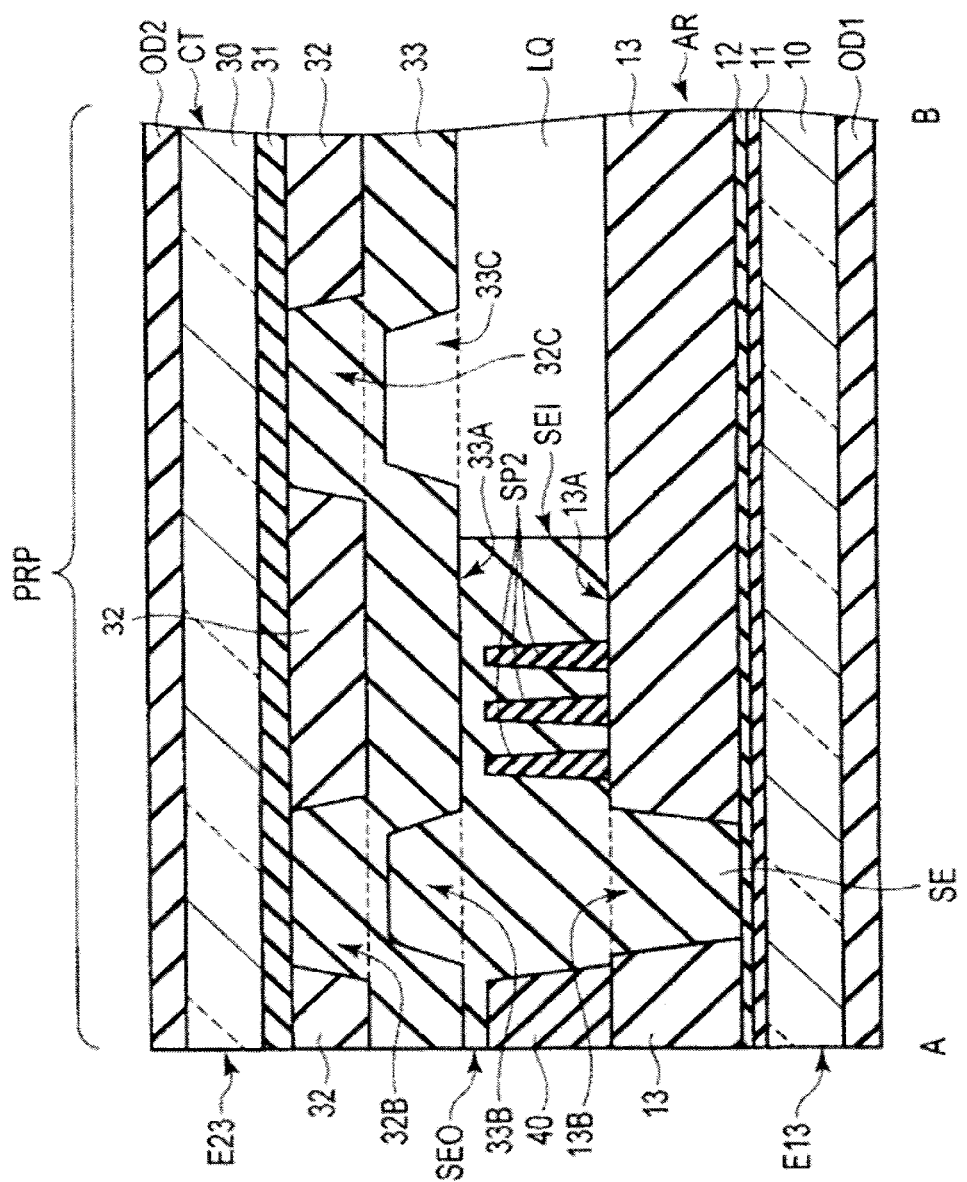
FIG. 3 is a cross-sectional view schematically showing a structure in a circumference area PRP of the display panel PNL taken along line A-B shown in FIG. 1.

FIG. 3 is a cross-sectional view schematically showing a structure in a circumference area PRP of the display panel PNL taken along line A-B shown in FIG. 1.

In the circumference area PRP, the array substrate AR includes peripheral wirings which are not illustrated, the first insulating film 11, the second insulating film 12, the third insulating film 13, etc., formed on the first insulating film 10 facing the counter substrate CT. The first insulating film 11, the second insulating film 12, and the third insulating film 13 extend up to the substrate end E13 of the array substrate AR. The third insulating film 13 is arranged on the second insulating film 12 in the circumference area PRP, and has a first flat surface 13A. In this embodiment, the third insulating film 13 has a first concave portion 13B. The first concave portion 13B includes the depth which penetrates to the second insulating film 12, for example.

In the circumference area PRP, the counter substrate CT includes the shield layer 31, the color filter 32, the overcoat film 33, etc., formed on the second insulating substrate 30 on the side facing the array substrate AR. The substrate end E23 of the counter substrate CT is located right above the substrate end E13 of the array substrate AR.

The shield layer 31 is formed on the second insulating substrate 30 facing the array substrate AR, and covers almost whole of the circumference area PRP. That is, the shield layer 31 is formed continuously up to the substrate end E23 without breaking off. The shield layer 31 is formed of the resin material colored in black or metal material having light blocking effect such as chromium (Cr), etc., for example.

The color filter 32 and the overcoat film 33 overlap with the shield layer 31 in the circumference area PRP. In this embodiment, the color filter 32 overlaps with the shield layer 31 in the position which counters the first surface 13A in the circumference area PRP, and extends up to the substrate end E23. Moreover, the color filter 32 includes a concave portion 32B penetrating to the shield layer 31 in the position which counters the first concave portion 13B. Although the color filter 32 arranged in the circumference area PRP is formed of the blue color filter, the color filter 32 may be formed of the resin material colored in other colors, for example.

The overcoat film 33 covers the color filter 32, and also covers the shield layer 31 exposed from the color filter 32. That is, the overcoat film 33 overlaps with the color filter 32 in the position which counters the first surface 13A, and extends to the concave portion 32B of the color filter 32 in the position facing the first concave portion 13B so as to overlap with the shield layer 31. Moreover, the overcoat film 33 extends up to the substrate end E23. The overcoat film 33 corresponds to a second organic insulating film, and includes a second flat surface 33A facing the first surface 13A. The overcoat film 33 also includes a second concave portion 33B that counters with the first concave portion 13B or overlaps with the concave portion 32B.

The display panel PNL is further equipped with a pillar-shaped spacer SP2 and a resin layer 40 in the circumference area PRP. The pillar-shaped spacer SP2 and the resin layer 40 are located between the first surface 13A of the third insulating film 13 and the second surface 33A of the overcoat film 33. The resin layer 40 is located on the substrate ends E13, E23 side, and the pillar-shaped spacer SP2 is located on the side adjacent to the active area. When forming the pillar-shaped spacer SP2 and the resin layer 40 with the pillar-shaped spacer SP1 in the array substrate AR, the pillar-shaped spacer SP2 and the resin layer 40 are formed on the first surface 13A of the third insulating film 13 in the shape of a taper which becomes thinner toward the counter substrate CT. The first concave portion 13B formed in the third insulating film 13 is located between the resin layer 40 and the pillar-shaped spacer SP2. That is, the resin layer 40 is located between the first concave portion 13B and the substrate end E13, and the pillar-shaped spacer SP2 is located adjacent to the first concave portion 13B on the active area side.

In addition, the pillar-shaped spacer SP2 and the resin layer 40 may be formed in the counter substrate CT, respectively. In this case, they are formed in the second surface 33A of the overcoat film 33 in the shape of a taper which is tapering off toward the array substrate AR. In this case, the second concave portion 33B is located between the resin layer 40 and pillar-shaped spacer SP2.

In this embodiment, the respective tip portions of the pillar-shaped spacer SP2 and the resin layer 40 are apart from the second surface 33A. That is, clearance is formed between the pillar-shaped spacer SP2 and the overcoat film 33, and between the resin layer 40 and the overcoat film 33. The height of the pillar-shaped spacer SP2 and the resin layer 40 from the first surface 13A to the tip portion is substantially the same. On the other hand, the height of the pillar-shaped spacer SP2 and the resin layer 40 from the first surface 13A to the tip portion is lower than the height of pillar-shaped spacer SP1 from the first surface 13A to the tip portion in the active area. This is resulted by forming the first concave portion 13B between the pillar-shaped spacer SP2 and the resin layer 40 when forming the pillar-shaped spacer SP1 with the same material as the pillar-shaped spacer SP2 and the resin layer 40. The resin material formed on the first surface 13A for forming the pillar-shaped spacer SP2 and the resin layer 40 flows into the first concave portion 13B. Accordingly, the film thickness of the resin material formed on the first surface 13A in the circumference becomes thinner than that in the active area.

The seal material SE to attach the array substrate AR and the counter substrate CT are arranged between the third insulating film 13 and the overcoat film 33. That is, the seal material SE intervenes between the first concave portion 13B and the second concave portion 33B while intervening between the first surface 13A and the second surface 33A, and pastes the array substrate AR and the counter substrate CT together. Furthermore, the seal material SE intervenes also between the resin layer 40 and the overcoat film 33 while contacting with the resin layer 40, and extends up to the neighborhood in which the substrate end E13 and the substrate end E23 overlap. When the pillar-shaped spacer SP2 and the resin layer 40 are formed in the counter substrate CT, respectively, the seal material SE intervenes also between the resin layer 40 and the third insulating film 13. The pillar-shaped spacer SP2 is surrounded by the seal material SE, and located in the seal material SE.

In addition, the seal material SE contacts with the resin material 40 and extends up to near the other substrate ends except for the mounting portion. i.e., the position in which the substrate end E11 and the substrate end E21 overlap, the substrate end E12 and the substrate end E22 overlap, and the substrate end E13 and the substrate end E23 overlap in the whole of the circumference area PRP, not limited to the illustrated area. An outer end surface SEO of the seal material SE does not necessarily extend up to the position in which the substrate ends overlap like the example shown in the figure. The seal material SE may contain filler.

The liquid crystal layer LQ is enclosed inside an internal end surface SEI of the seal material SE on the active area side.

Moreover, in this embodiment, the counter substrate CT includes a third concave portion 33C facing the third insulating film 13 in the inner side surrounded by the seal material SE, i.e., the area in which the liquid crystal layer LQ is enclosed in the circumference area PRP. That is, the color filter 32 includes a concave portion 32C which counters the first surface 13A in the circumference area PRP. The color filter 32 includes the concave portion 32B on the substrate end side and a concave portion 32C on the active area side. The concave portion 32C has depth penetrating to the shield layer 31 like the concave portion 32B.

The overcoat film 33 covers the color filter 32, and also the shield layer 31 exposed from the color filter 32. That is, the overcoat film 33 overlaps with the shield layer 31 extending to the concave portion 32C of the color filter 32 in the position where the overcoat film 33 counters the first surface 13A. The overcoat film 33 includes a third concave portion 33C that counters the first surface 13A and overlaps the concave portion 32C.

In addition, although not illustrated, the common electrode may be arranged on the overcoat film 33 facing the array substrate AR in the counter substrate CT, like in the active area.

Figure 4:
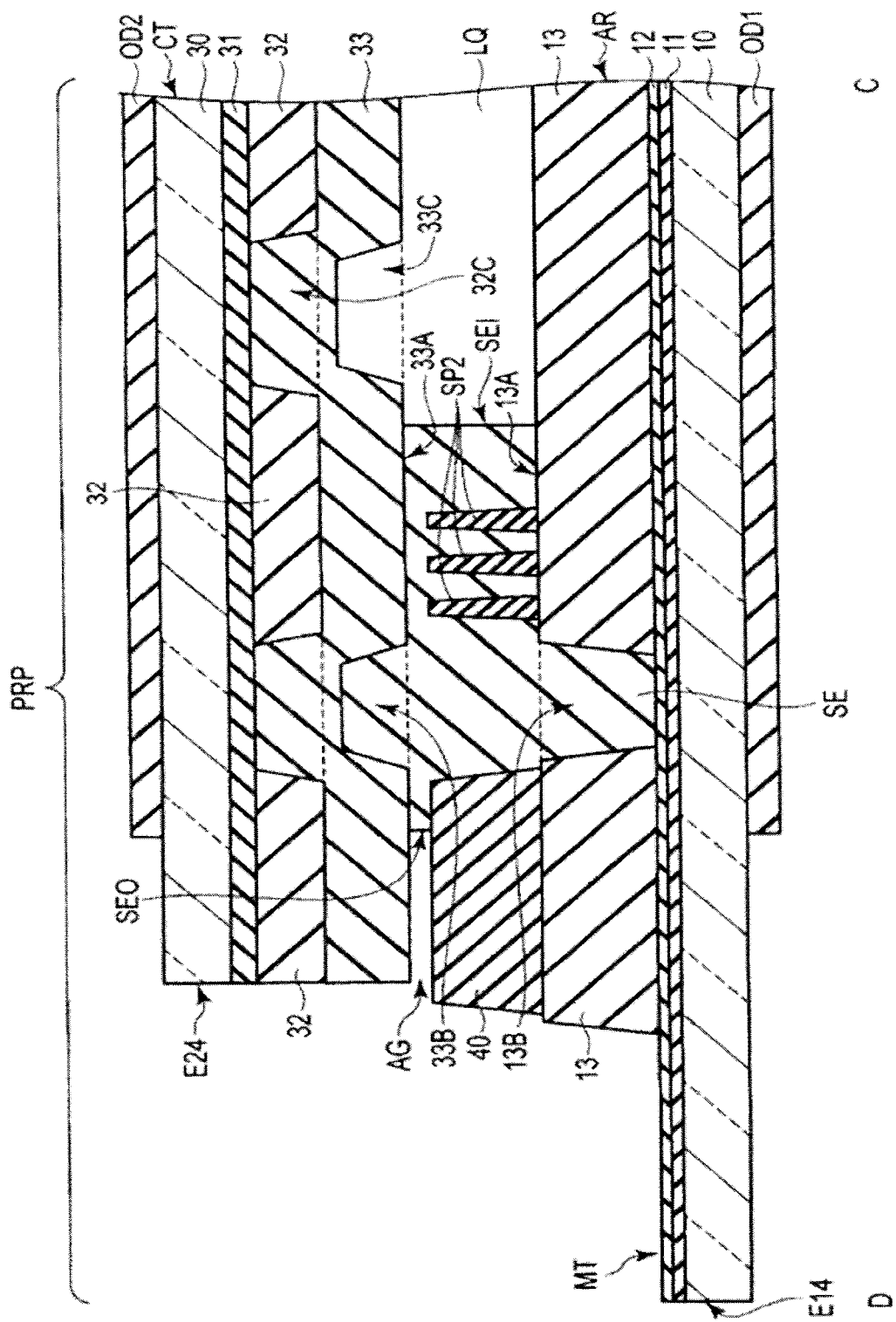
FIG. 4 is a cross-sectional view schematically showing a structure in the circumference area PRP of the display panel PNL taken along line C-D shown in FIG. 1.

FIG. 4 is a cross-sectional view schematically showing a structure in the circumference area PRP of the display panel PNL taken along line C-D shown in FIG. 1.

The array substrate AR is equipped with the mounting portion MT. In this embodiment, the first insulating film 11 and the second insulating film 12 extend up to the substrate end E14. The third insulating film 13 extends up to the substrate end E24 exposing the mounting portion MT. The resin layer 40 and the pillar-shaped spacer SP2 are formed on the third insulating film 13. The resin layer 40 is located between the substrate end E24 and the first concave portion 13B, and extends up to the neighborhood of the substrate end E24. The pillar-shaped spacer SP2 is located between the first concave portion 13B and the active area.

The counter substrate CT is formed so that the mounting portion MT of the array substrate AR may be exposed, and the substrate end E24 is located more inside than the substrate end E14. In this embodiment, the shield layer 31, the color filter 32, and the overcoat film 33 extend up to the substrate end E24. The overcoat film 33 includes the second concave portion 33B and the third concave portion 33C as well as the cross-section shown in FIG. 3. The substrate end E24 is located above the resin layer 40.

while the seal material SE intervenes between the first surface 13A and the second surface 33A, the seal material SE intervenes between the first concave portion 13B and the second concave portion 33B, and pastes the array substrate AR and the counter substrate CT together. Furthermore, while the seal material SE contacts the resin layer 40, the seal material SE intervenes between the resin layer 40 and the overcoat film 33. The outside end surface SEO of the seal material SE along the mounting portion MT is located on the active area side rather than the substrate end E24. That is, in the position where the array substrate AR and the counter substrate CT counter along with the mounting portion MT, a space AG in which the seal material SE does not intervene between the resin layer 40 and the overcoat film 33. The seal material SE does not exist right under the substrate end E24.

Figure 5:
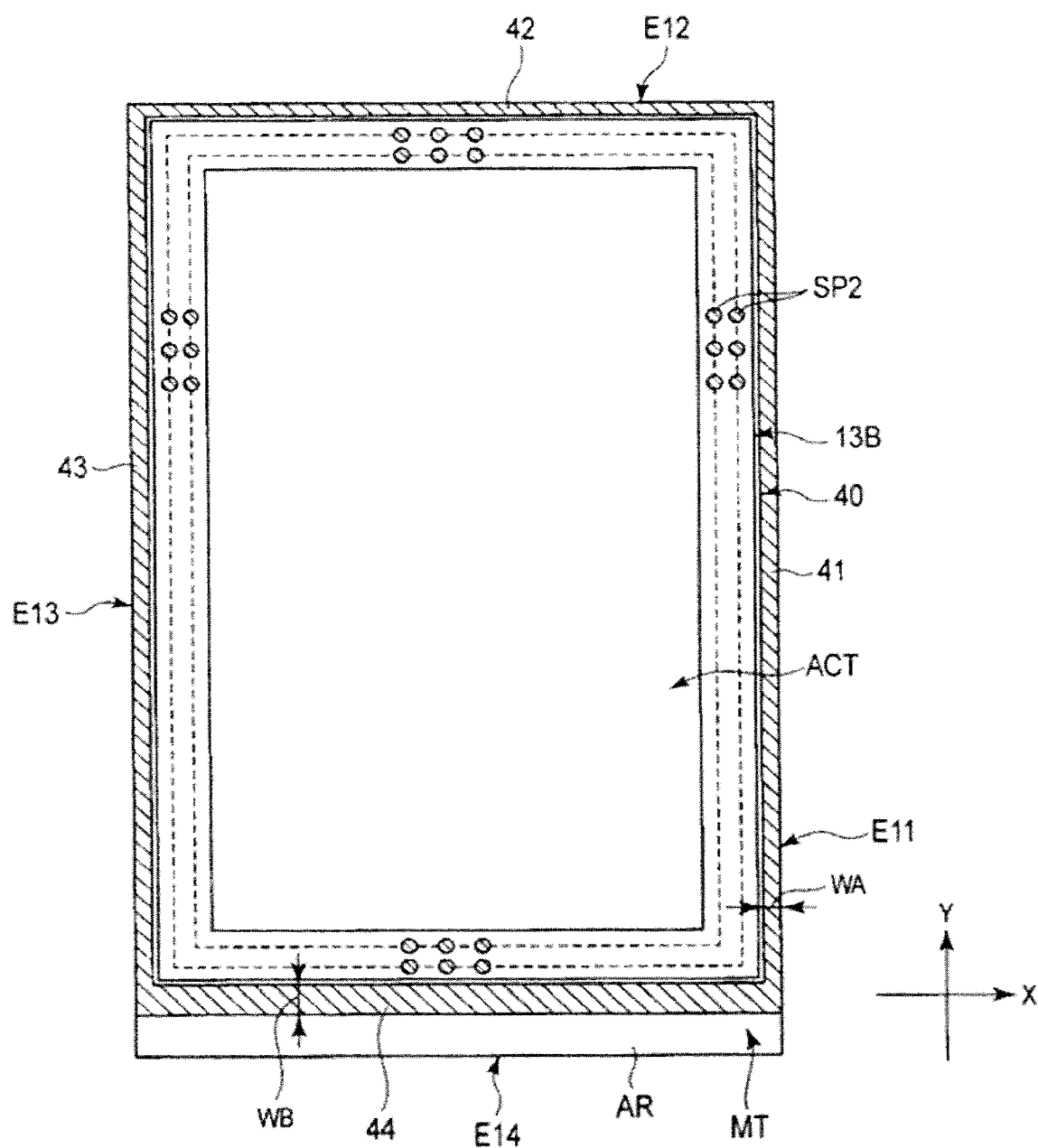
FIG. 5 is a view showing a layout of pillar-shaped spacers SP2 and a resin layer 40 in the display panel PNL according to the embodiment.

FIG. 5 is a view showing a layout of the pillar-shaped spacer SP2 and the resin layer 40 in the display panel PNL according to the embodiment.

The pillar-shaped spacer SP2 is located in the periphery of the rectangular active area ACT, and formed in the dot shape. Although the illustrated example shows the case where the pillar-shaped spacers SP2 are formed in two lines, the layout and arrangement density of the pillar-shaped spacer SP2 are not restricted to this example. For example, it is possible to control the cell gap of the circumference area PRP by adjusting the arrangement density of the pillar-shaped spacer SP2. More specifically, since the seal material SE invades between the pillar-shaped spacer SP2 and the counter substrate CT by arranging the pillar-shaped spacer SP2 densely, the attached substrate CT easily warps upward. At this time, the density per unit area of the pillar-shaped spacer SP2 located in the seal material SE is made larger than the density per unit area of the spacer arranged in the exterior of the seal material SE, i.e., the active area ACT. According to such configuration, the cell gap of the circumference area PRP becomes larger than the cell gap of the active area ACT. The expansion of the cell gap which arose in the circumference area PRP is utilizable as a space which accommodates the excessive liquid crystal material injected more than needed by One Drop Fill (ODF) method in the manufacturing process. That is, since the surplus liquid crystal material is accommodated by the space which is formed by warping up of the counter substrate CT in the circumference area PRP, the thickness of the liquid crystal layer becomes uniform in the active area ACT. Therefore, it becomes possible to achieve excellent and uniform display grace throughout the active area ACT.

The resin layer 40 is formed in the shape of a rectangular frame. That is, the resin layer 40 includes a segment 41 along the substrate end E11, a segment 42 along the substrate end E12, a segment 43 along the substrate end E13, and a segment 44 along the mounting portion MT of the array substrate AR. The segment 42 and the segment 44 extend in the shape of a straight line along the first direction X. The segment 41 and the segment 43 extend in the shape of a straight line along the second direction Y. While the segments 41 to 43 have the same width WA, the segment 44 has broader width WB than the segments 41 to 43.

The first concave portion 13B is located between the pillar-shaped spacer SP2 and the resin layer 40, and formed in the shape of a rectangular frame. Although the width of the first concave portion 13B is formed uniformly, the portion along with the mounting portion MT may be set to the smaller width rather than other portions.

Next, one example of a manufacturing method of the above-mentioned display panel PNL is explained.

First, a mother substrate which collectively forms a plurality of array substrates AR is prepared. The first mother substrate is formed using an insulating substrate which becomes the first insulating substrate, and equipped with various wirings, such as the gate line, the source line, the switching element, etc., and various insulating films such as the first insulating film, the second insulating film, the third insulating film, the pixel electrode, the first alignment film, the pillar-shaped spacer, and the resin layer, etc.

On the other hand, a second mother substrate which collectively forms a plurality of counter substrates CT is prepared. The second mother substrate is formed using an insulating substrate which becomes the second insulating substrate, and equipped with the shield layer, the color filter layer, the overcoat layer, the second alignment film, etc.

Then, the seal material SE is arranged on the first mother substrate or the second mother substrate so that the seal material surrounds the active area forming a closed-loop. The seal material SE is formed using ultraviolet curing resin, and applied by a dispenser.

Then, liquid crystal material is dropped on the inner side surrounded by the seal material SE, and the first mother substrate and the second mother substrate are pasted together. Although the seal material SE spreads in its width direction at this time, the spread of the seal material SE is controlled by balancing with the spreading strength of the liquid crystal material toward the outside on the inner side of seal material SE. On the other hand, excessive spread of the seal material SE to outside is suppressed because the overcoat film 33, the third insulating film 13, and the resin layer 40 function as a floodgate against the seal material SE which entered into the first concave portion 13B and the second concave portion 33B, and the floodgate becomes resistance at the time of spreading of the seal material SE toward the outside. Therefore, excessive spread of the seal material SE is controlled. In particular, the seal material is barred by the resin layer 40 formed widely in the region along the mounting portion MT, and the outside end surface SEO stops on the resin layer adjacent to the first concave portion 13B and the second concave portion 33B. For this reason, crushing (contact to the pillar-shaped spacer SP2 and the resin layer 40 by an overcoat film) by excessive spread of the seal material SE is controlled. Then, curing processing is carried out to the seal material SE.

Then, the display panels PNL are taken out from the pair of mother substrates, in which the liquid crystal layer is held between the first mother substrate and the second mother substrate. In this process, the both of the first mother substrate and the second mother substrate are cut along cutting lines, respectively. The second mother substrate is cut down on the resin layer 40 so as to expose the mounting portion MT.

According to this embodiment, even if the variation in the line width of the seal material SE occurs due to the variation in the amount of the applied seal material SE, the third insulating film 13, the resin layer 40 and the overcoat film 33 function as a floodgate. Accordingly, it becomes possible to control excessive spread of the seal material SE to the outside. Especially, in the region along the mounting portion MT, since the seal material SE is dammed up by the resin layer 40 formed broadly, the outside end surface SEO of the seal material SE stops on the resin layer 40 adjacent to the first and second concave portions 13B and 33B. For this reason, crushing by excessive spread of the seal material SE can be controlled, and it becomes possible to form a proper cell gap in the region along the mounting portion MT in the circumference area PRP. The display unevenness (gravity unevenness, etc.) in the region along the mounting portion MT can be controlled, and to obtain good display grace.

Moreover, in the process of taking out the display panels PNL from the pair of mother substrates, the second mother substrate for forming the counter substrate CT is cut down in the upper portion of the resin layer 40 so that the mounting portion MT may be exposed. In this case, since the seal material SE is not placed at the position which overlaps with the cutting line of the second mother substrate, it becomes easy to remove the portion facing the mounting portion MT by cutting.

Moreover, since the seal material SE is filled up not only between the third organic insulating film 13 and the overcoat layer 33 but also in the first concave portion 13B and the second concave portion 33B, it becomes possible to increase the amount of the applied seal material SE. Further, it becomes possible to increase the areas of the array substrate and the counter substrate, to which the seal material SE contacts, respectively. For this reason, it becomes possible to improve adhesive strength to attach the array substrate AR and the counter substrate CT by the seal material SE.

In addition, in the circumference area PRP which does not contribute to the image display, it becomes possible to collect air bubbles in the third concave portion 33C by forming the third concave portion 33C inside the seal material SE in which the liquid crystal layer LQ is held, even if air bubbles are generated in the liquid crystal layer LQ. Especially, when the dropping injection method is applied as the manufacturing method of the display panel PNL, and the dropped amount of the liquid crystal material is scant, air bubbles (low-temperature air bubbles) are easily generated in the liquid crystal layer LQ in a shock applied from the exterior, etc. It is not permitted that such air bubbles exist in the active area ACT, and the bubbles cause the fall of the manufacturing yield. According to this embodiment, it becomes possible to suppress the fall of the manufacturing yield by collecting the bubbles generated in the liquid crystal layer LQ in the third concave portion 33C that does not contribute to the display. Moreover, when the dropping injection method is applied, even if the dropped amount of the liquid crystal material is superfluous, it becomes possible to accommodate the surplus liquid crystal material in the third concave portion 33C, and to control the variation in the cell gap in the active area resulting from the variation in the dropped amount, and to control generating of the display unevenness in the active area.

As explained above, according to this embodiment, it becomes possible to supply the liquid crystal display device with high display quality.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

In the above-mentioned embodiment, the seal material is arranged on one substrate without a break so that the active area may be surrounded. After liquid crystal material was dropped by the dropping injection method, the pair of substrates is pasted together. However, the embodiment is not restricted to the above structure. For example, the pair of substrates is pasted together with a vacuum injection method by arranging the seal material so that active area may be surrounded, while forming a liquid crystal injecting mouth on one substrate.

The invention claimed is:

1. A display device, comprising:
   a first substrate including:
      a first insulating substrate, and
      a first insulating layer arranged on the first insulating substrate in a circumference area outside an active area for displaying images;
   a second substrate including:
      a second insulating substrate, and
      a second insulating layer formed on the second insulating substrate in the circumference area:
   a seal material arranged between the first insulating layer and the second insulating layer to attach the first substrate and the second substrate;
   a resin layer arranged between the first insulating layer and the second insulating layer, and arranged along at least three substrate ends in the circumference area; and
   a pillar-shaped spacer in the circumference area, wherein
   a thickness of the second insulating layer located directly above the pillar-shaped spacer is greater than a thickness of the resin layer, and
   a first concave portion in the first insulating layer is formed between the resin layer and the pillar-shaped spacer.

2. The display device according to claim 1, wherein the seal material is arranged between the first insulating layer and the resin layer or between the second insulating layer and the resin layer.

3. The display device according to claim 1, wherein the pillar-shaped spacer is located in the seal material apart from the resin layer and adjacent to the active area between the first insulating layer and the second insulating layer.

4. The display device according to claim 1, wherein a second concave portion in the second insulating layer is formed to face the first concave portion.

5. A display device, comprising:
a first substrate including:
a first insulating substrate, and
a first insulating layer arranged on the first insulating substrate in a circumference area outside an active area for displaying images;
a second substrate including:
a second insulating substrate, and
a second insulating layer formed on the second insulating substrate in the circumference area;
a resin layer arranged between the first insulating layer and the second insulating layer, and arranged along at least three substrate ends in the circumference area;
a seal material arranged between the first insulating layer and the second insulating layer to attach the first substrate and the second substrate; and
a pillar-shaped spacer in the circumference area, wherein
an outside end surface of the seal material is arranged between the second insulating layer and the resin layer in a position where the first substrate faces the second substrate,
a thickness of the second insulating layer located directly above the pillar-shaped spacer is greater than a thickness of the resin layer, and
a first concave portion in the first insulating layer is formed between the resin layer and the pillar-shaped spacer.

6. The display device according to claim 5, wherein the pillar-shaped spacer is located in the seal material apart from the resin layer and adjacent to the active area between the first insulating layer and the second insulating layer.

7. The display device according to claim 5, wherein a second concave portion in the second insulating layer is formed to face the first concave portion.

8. A display device, comprising:
a first substrate including:
a first insulating substrate, and
a first insulating layer arranged on the first insulating substrate in a circumference area outside an active area for displaying images;
a second substrate including:
a second insulating substrate, and
a second insulating layer formed on the second insulating substrate in the circumference area;
a seal material arranged between the first insulating layer and the second insulating layer to attach the first substrate and the second substrate;
a resin layer arranged between the first insulating layer and the second insulating layer, and arranged along at least three substrate ends in the circumference area;
a pillar-shaped spacer in the circumference area; and
a first concave portion formed between the resin layer and the pillar-shaped spacer in the first insulating layer.

9. The display device according to claim 8, wherein a second concave portion is formed to face the first concave portion in the second insulating layer.

10. The display device according to claim 8, wherein the seal material is arranged between the first insulating layer and the resin layer or between the second insulating layer and the resin layer.

11. The display device according to claim 8, wherein the pillar-shaped spacer is located in the seal material apart from the resin layer and adjacent to the active area between the first insulating layer and the second insulating layer.

12. The display device according to claim 9, further comprising:
a first optical element including a first polarizing plate; and
a second optical element including a second polarizing plate, wherein
the first optical element is arranged in an external surface of the first substrate and overlaps the first concave portion, and
the second optical element is arranged in an external surface of the second substrate and overlaps the second concave portion.

13. The display device according to claim 9, further comprising a third concave portion formed in the second insulating layer, being closer to the active area than the second concave portion, and not overlapping the seal material.

* * * * *